J. F. LAMB.
LUNCH BOX.
APPLICATION FILED MAR. 5, 1912.
1,061,386.
Patented May 13, 1913.
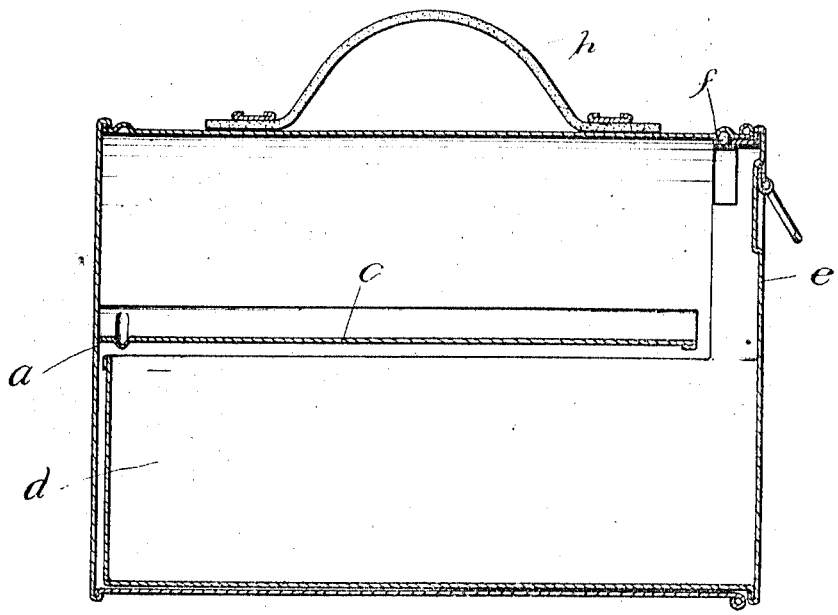
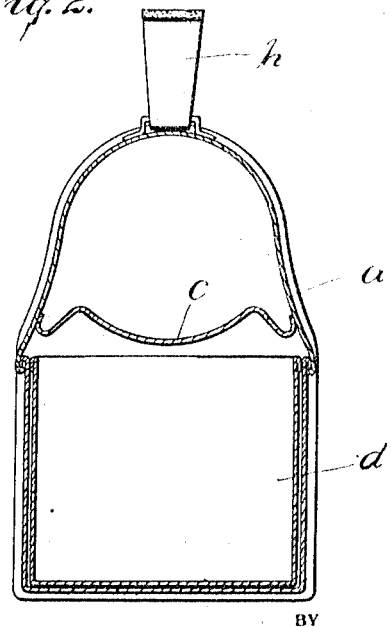
WITNESSES
Louis Lucia.
M. A. Shuckerow
INVENTOR
Joseph F. Lamb:
N. E. Start
his ATTORNEY

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

LUNCH-BOX.

1,061,386.  Specification of Letters Patent.  Patented May 13, 1913.

Application filed March 5, 1912. Serial No. 681,681.

*To all whom it may concern:*

Be it known that I, JOSEPH F. LAMB, a citizen of the United States, and a resident of New Britain, in the county of Hartford and State of Connecticut, have invented certain new and useful Improvements in Lunch-Boxes, of which the following is a specification.

The object of my invention is to produce a device of the character described having features of novelty and advantage.

An embodiment of the invention is illustrated in the drawings in which—

Figure 1 is a central vertical section in side elevation. Fig. 2 is a central vertical section in end elevation.

Broadly considered my invention consists in a lunch box made in separate sections one of which has a sliding and interlocking engagement with the other forming a complete structure containing separate compartments, one of which is primarily designed to receive a liquid container, such as a vacuum insulated bottle the other compartment being adapted to receive food.

Referring to the drawings $a$ denotes a casing open at one end provided with a transverse partition, or tray extending between and secured to its side walls to divide the casing into two compartments. The central part of this tray is preferably curved to properly support a bottle lying on its side as indicated at $c$.

$d$ is a food compartment adapted to fit and slide into the lower part of the casing and having attached to its outer end a closing wall $e$ for the casing $a$, this closing wall having a part such as the spring pressed pin $f$ which interlocks with the casing to hold the food compartment in place and to form a complete closure for the end of the casing.

$h$ is a handle secured to the top of the casing.

I claim as my invention:

1. In a lunch box, a casing open at one end, a bottle holder in said casing, a food receptacle adapted to fit and slide in the casing under said bottle holder and be covered by said casing, and a closure for the open end of the casing carried by the food receptacle.

2. In a lunch box, two telescoping parts one of which is open-ended and provided with a bottle holder and a compartment thereunder, the other part being provided with a food receptacle adapted to fit in said compartment, and a closure for the open end of the first mentioned part.

3. In a lunch box, a casing open at one end, a food receptacle adapted to fit and slide in and be covered by said casing, a compartment in said casing above said food receptacle, a bottle holder therein, and a closure for the open end of said casing carried by said food compartment.

4. In a lunch box a casing open at one end, a bottle holding tray extending transversely between and attached to the walls thereof, a food compartment adapted to fit within said casing underneath said tray, and means carried by said food compartment for closing the end of said casing.

JOSEPH F. LAMB.

Witnesses:
GEORGE A. DOWNS,
GEORGE E. CURTISS.